(12) United States Patent
Campbell

(10) Patent No.: US 7,625,000 B2
(45) Date of Patent: Dec. 1, 2009

(54) VARIABLE RATIO FLOATING SUSPENSION SYSTEM

(75) Inventor: Cyril G. Campbell, Polk City, FL (US)

(73) Assignee: Zarach Industries, Inc., Auburndale, FL (US)

( * ) Notice: Subject to any disclaimer, the term of this patent is extended or adjusted under 35 U.S.C. 154(b) by 365 days.

(21) Appl. No.: 11/791,524

(22) PCT Filed: Nov. 14, 2005

(86) PCT No.: PCT/US2005/040805

§ 371 (c)(1), (2), (4) Date: May 24, 2007

(87) PCT Pub. No.: WO2006/062677

PCT Pub. Date: Jun. 15, 2006

(65) Prior Publication Data

US 2008/0073168 A1 Mar. 27, 2008

(51) Int. Cl.
*B60G 7/00* (2006.01)
(52) U.S. Cl. .................... 280/124.133; 280/124.134; 280/124.135; 280/124.136
(58) Field of Classification Search .......... 280/124.133, 280/124.134, 124.135, 124.136, 124.145
See application file for complete search history.

(56) References Cited

U.S. PATENT DOCUMENTS

| | | | |
|---|---|---|---|
| 946,143 A | | 1/1910 | Levedahl |
| 2,226,406 A | | 12/1940 | Krotz |
| 3,080,177 A | | 3/1963 | Mather |
| 4,212,481 A | | 7/1980 | Ribi |
| 4,456,282 A | | 6/1984 | Rumpel |
| 4,756,517 A | | 7/1988 | Kakimoto |
| 4,772,044 A | * | 9/1988 | Booher ................. 280/124.134 |
| 5,240,278 A | | 8/1993 | Nelms |
| 5,265,902 A | | 11/1993 | Lewis |
| 5,286,052 A | * | 2/1994 | Lukianov .............. 280/124.134 |
| 5,411,285 A | | 5/1995 | Lee |
| 5,427,395 A | | 6/1995 | Urbach |
| 5,451,073 A | | 9/1995 | Inoue |
| 5,462,302 A | | 10/1995 | Leitner |
| 5,516,130 A | * | 5/1996 | Mitchell ............... 280/124.134 |
| 5,816,606 A | | 10/1998 | Cruise et al. |
| 5,921,568 A | | 7/1999 | Cruise et al. |
| 6,000,706 A | | 12/1999 | Boberg et al. |
| 6,039,337 A | * | 3/2000 | Urbach ................. 280/124.134 |
| 6,237,706 B1 | | 5/2001 | Karpik et al. |

(Continued)

FOREIGN PATENT DOCUMENTS

FR 2693407 1/1994

(Continued)

*Primary Examiner*—Toan C To
(74) *Attorney, Agent, or Firm*—Richard C. Litman

(57) ABSTRACT

The variable ratio floating suspension system (10) includes upper (30) and lower (40) leverage arms with a shock-absorbing component (50) connecting the leverage arms (30, 40). In the preferred embodiment, the leverage arms (30, 40) and shock-absorbing component (50) pivotally connect a vehicle chassis to a vehicle wheel spindle (26). As the vehicle moves over uneven terrain, the configuration of the variable ratio floating suspension system (10) isolates vibrations and other unwanted forces in the shock-absorbing component (50) so that these forces are not transferred to the associated vehicle chassis.

10 Claims, 5 Drawing Sheets

U.S. PATENT DOCUMENTS

| | | |
|---|---|---|
| 6,305,701 B1 | 10/2001 | Bobinger et al. |
| 6,390,484 B1 | 5/2002 | Green et al. |
| 6,412,796 B1 | 7/2002 | Kroniger |
| 6,412,797 B1 | 7/2002 | Park |
| 6,431,532 B1 | 8/2002 | McKenzie et al. |
| 6,511,078 B2 | 1/2003 | Sebe |
| 6,585,276 B2 | 7/2003 | Boucquey |
| 6,672,605 B2 | 1/2004 | Basnett |
| 6,695,329 B2 | 2/2004 | Handa |
| 6,752,408 B2 | 6/2004 | La |
| 2004/0155425 A1 | 8/2004 | Schluntz |
| 2006/0220338 A1* | 10/2006 | Orimoto et al. ....... 280/124.141 |
| 2007/0176387 A1* | 8/2007 | Tsuruta et al. ........ 280/124.135 |
| 2007/0267837 A1* | 11/2007 | Sanville ............... 280/124.134 |
| 2008/0067774 A1* | 3/2008 | Sanville et al. ........ 280/124.138 |

FOREIGN PATENT DOCUMENTS

| | | |
|---|---|---|
| JP | 3-231010 | 10/1991 |

\* cited by examiner

VARIABLE RATIO FLOATING SUSPENSION SYSTEM

FIELD OF THE INVENTION

The present invention relates generally to suspension systems for vehicles, and more particularly, to a variable ratio floating suspension system for use with a vehicle and for use as a vibration dampening system.

DESCRIPTION OF THE RELATED ART

A suspension system for a vehicle is generally configured to provide a comfortable ride and to enhance safety while driving the vehicle. A typical suspension system connects an axle or wheel carrier and a vehicle body to one another, and absorbs vibrations and impacts from a road surface while the vehicle is being driven.

To absorb impacts, the vehicle suspension system usually includes a shock absorber connected in a manner which provides movement in a vertical direction and which endures driving force, braking force and centrifugal force that are generated from the wheels; the suspension system is usually connected rigidly so that there is limited movement in a horizontal direction.

The shock absorber or dampening mechanism of the suspension system is commonly disposed between an upper control arm and a lower control arm or vehicle chassis. Generally, one end of the shock absorber is rigidly connected to the vehicle chassis with the other end of the shock absorber being movably connected to a control arm to absorb the up-and-down impacts transmitted from the wheel. This arrangement creates an open system where a portion of the dampening force or vibration force is transmitted from the shock absorber to the vehicle chassis, which may result in an uncomfortable ride. A closed system that operatively connects the shock absorber to the upper and lower leverage arms and permits both ends of the shock absorber to move relatively simultaneously as the wheel moves up-and-down may be beneficial in reducing the transfer of vibration from the wheel to the vehicle chassis or frame.

Therefore, a variable ratio floating suspension system for vehicles that solves the aforementioned problems is desired.

DISCLOSURE OF INVENTION

The variable ratio floating suspension system is configured for use with a vehicle or for use as an anti-vibration mount. The variable ratio floating suspension system includes an actuating arm having an upper end portion and a lower end portion. A first end portion of an upper leverage arm is pivotally connected to a vehicle chassis or frame at a first pivot joint. A second end portion of the upper leverage arm is pivotally connected to an upper end portion of the actuating arm at a second pivot joint. A first end portion of a lower leverage arm is pivotally connected to the vehicle chassis at a first pivot joint, and a second end portion is pivotally connected to the lower end portion of the actuating arm at a second pivot joint. A shock absorbing mechanism is interposed between the upper and lower leverage arms. Further, an upper end portion of the shock absorbing mechanism is operatively connected to the upper leverage arm at an upper shock joint. A lower end portion of the shock absorbing mechanism is operatively connected to the lower leverage arm at a lower shock joint.

The first pivot joint disposed on the upper leverage arm is positioned between the upper shock joint and the second pivot joint, which are disposed on the upper leverage arm. In a similar manner, the lower shock joint disposed on the lower leverage arm is positioned between the first and second pivot joints disposed on the lower leverage arm. The first pivot joint of the upper leverage arm and the lower shock joint of the lower leverage arm are oriented so that the upper end portion and lower end portion of the shock absorbing mechanism move or travel at substantially the same ratio, such as, for example, a 1:1 ratio, when the actuating arm moves or pivots the lower and upper leverage arms about their respective pivot joints.

These and other aspects of the present invention will become readily apparent upon further review of the following specification and drawings.

BRIEF DESCRIPTION OF DRAWINGS

Similar reference characters denote corresponding features consistently throughout the attached drawings.

BEST MODES FOR CARRYING OUT THE INVENTION

Figure 1A:
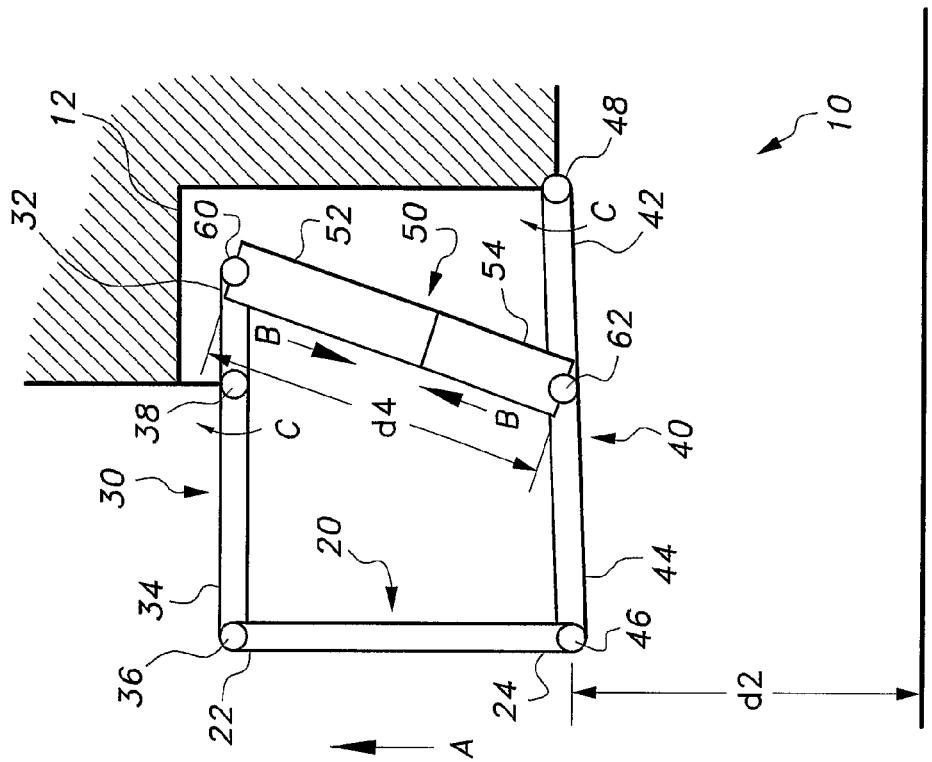
FIG. 1A is a schematic view of a variable ratio floating suspension system for vehicles according to the present invention.
Figure 1B:
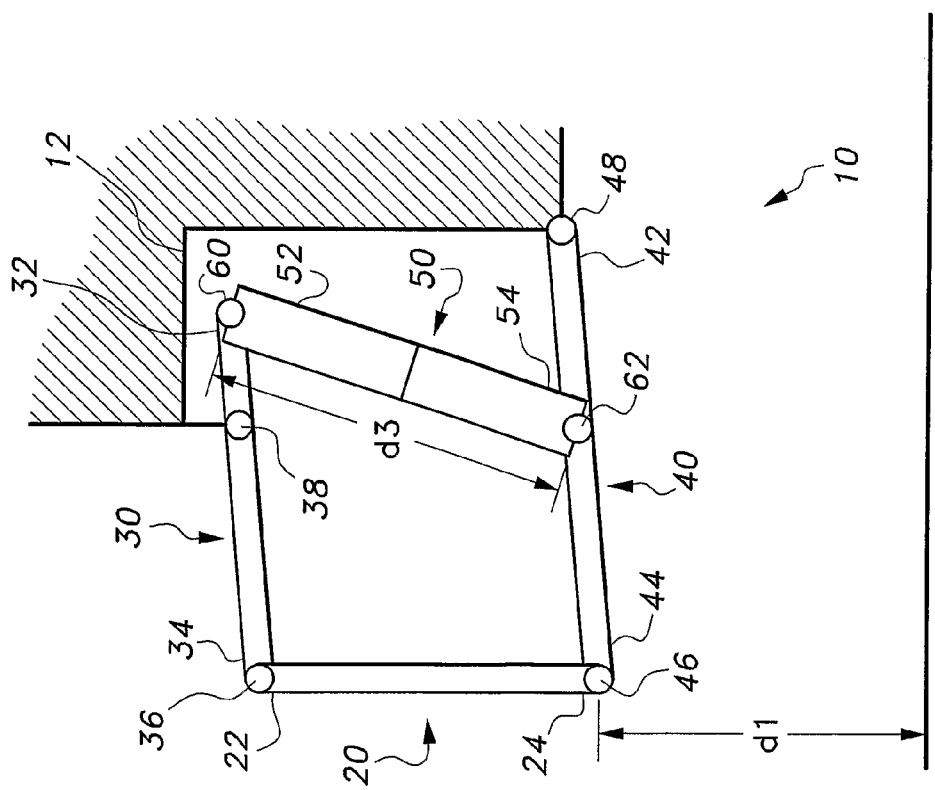
FIG. 1B is a schematic view of the variable ratio floating suspension system for vehicles according to the present invention.

Referring now to FIGS. 1A and 1B, there is shown a schematic view of a variable ratio floating suspension system, generally indicated as 10, according to the invention. The variable ratio floating suspension system 10 is designed and configured to be a closed system, such that the dampening or shock absorbing mechanism 50 is not attached to the vehicle chassis or frame 12, but instead is operatively connected to an upper leverage arm 30 and a lower leverage arm 40 to create a "floating" suspension system, which isolates the dampening force or vibration being transmitted from the wheel to the vehicle chassis. The term "floating" is to be understood to refer to the shock absorbing mechanism 50 as part of the closed system. In other words, the shock absorbing mechanism 50 is not attached to the vehicle chassis or frame 12, but instead is operatively connected within a closed system to absorb and dissipate energy, such as that generated by vibrational forces, being transferred from the up-and-down movement or impact of the wheel against the road surface.

As illustrated in FIGS. 1A and 1B, the variable ratio floating suspension system 10 includes an upper leverage arm 30 having a first end portion 32 operatively connected to an upper end portion 52 of the shock absorbing mechanism 50 at upper shock joint 60. The second end portion 34 of the upper leverage arm 30 is pivotally connected to an upper end portion 22 of an actuating arm 20 at a second pivot joint 36. The upper leverage arm 30 is pivotally connected to the vehicle chassis or frame 12 at a first pivot joint 38. The first pivot joint 38 is positioned on the upper leverage arm 30 between the upper shock joint 60 and the pivot joint 36. Preferably, the first pivot joint 38 is positioned on the upper leverage arm 30 and is positioned approximately intermediate the upper shock joint 60 and the pivot joint 36.

The variable ratio floating suspension system 10 also includes a lower leverage arm 40 having a first end portion 42 pivotally connected to the vehicle chassis or frame 12 at a first pivot joint 48. The second end portion 44 of the lower leverage arm 40 is pivotally connected to a lower end portion 24 of the actuating arm 20 at a second pivot joint 46. The lower leverage arm 40 is operatively connected to a lower end portion 54 of the shock absorbing mechanism 50 at lower shock joint 62. The lower shock joint 62 is positioned on the lower leverage arm 40 between the pivot joint 46 and the pivot joint 48. Preferably, the first pivot joint 48 is positioned on the lower leverage arm 40 is approximately intermediate the lower shock joint 62 and the second pivot joint 46.

The first pivot joint 38 of the upper leverage arm 30 and the lower shock joint 62 of the lower leverage arm 40 are oriented so that the upper and lower end portions 52 and 54 of the shock absorbing mechanism 50 move or travel at substantially the same ratio, such as, for example, a 1:1 ratio, when the actuating arm 20 moves or pivots the lower and upper leverage arms 40 and 30 about their respective pivot joints 48 and 38, respectively.

The actuating arm 20 has an upper portion 22 and a lower portion 24 and is operatively connected to upper and lower leverage arms 30 and 40 at second pivot joints 36 and 46, respectively. The actuating arm 20 can be a knuckle or spindle with a hub extending outwardly therefrom for mounting a wheel thereon. Additionally, the actuating arm 20 can be a linkage arm, support member, beam, hanger, bracket, or any other suitable connecting member interposed between the upper and lower leverage arms 30 and 40. The pivot joints 36, 38, 46 and 48 each can be a bushing, ball-and-socket joint, a pivot pin, a fastener, a through bolt, or any other suitable connector which provides for pivotal movement about a pivot axis.

The shock absorbing mechanism 50 can be any suitable dampening mechanism, such as a shock and spring assembly, a shock absorber, coil shock, airbag, solid rubber, polyurethane mount, air bellows, or any other suitable shock absorbing or dampening mechanism.

Additionally, accessories or mounting brackets for supporting suspension components can be connected to the variable ratio floating suspension system 10; for example, an anti-roll bar can be connected to the lower leverage arm 40.

FIG. 1A shows the variable ratio floating suspension system 10 in a static mode. The lower leverage arm 40 is at a static ride height of dl with the shock absorbing mechanism 50 having a distance d3 between the upper shock joint 60 and the lower shock joint 62. As illustrated in FIG. 1B, when the actuating member 20, such as a knuckle or spindle having a wheel connected thereon, moves in the general direction of arrow A, the distance d2 becomes greater than dl (of FIG. 1A), causing the upper and lower leverage arms 30 and 40, respectively, to pivot about pivot joints 38 and 48 in the general direction of arrow C. The geometry and orientation of the upper and lower leverage arms 30, 40 with respect to the shock absorbing mechanism 50 is such that the forces entering the shock absorbing mechanism 50 along arrows B of the upper and lower shock joints 60 and 62 are substantially equal. With the forces directed towards one another inside the shock absorbing mechanism 50, the resultant energy is absorbed by the shock absorbing mechanism 50. Since the shock absorbing mechanism 50 is not directly attached to the vehicle chassis or frame 12, the vibration and dampening force remains within variable ratio floating suspension system 10 instead of being transferred to the frame 12.

As indicated by arrows B, the upper and lower portions 52 and 54 of the shock absorbing mechanism 50 move toward and away from each other at the same rate or ratio, with the distance between joints 60 and 62 being defined as distance d4, which is less than d3 when shock absorbing mechanism 50 is compressed. The pivot joints 38 and 62 may be located closer or farther away from the upper shock joint 60 and the pivotal joint 48 to maintain substantially simultaneous movement of upper portion 52 and lower portion 54 of shock absorbing mechanism 50 along directional arrows B. Hence, the geometry and configuration of the variable ratio floating suspension system 10 will vary depending on the vehicle and environment in which the variable ratio floating suspension system 10 is being adapted for.

Figure 2:
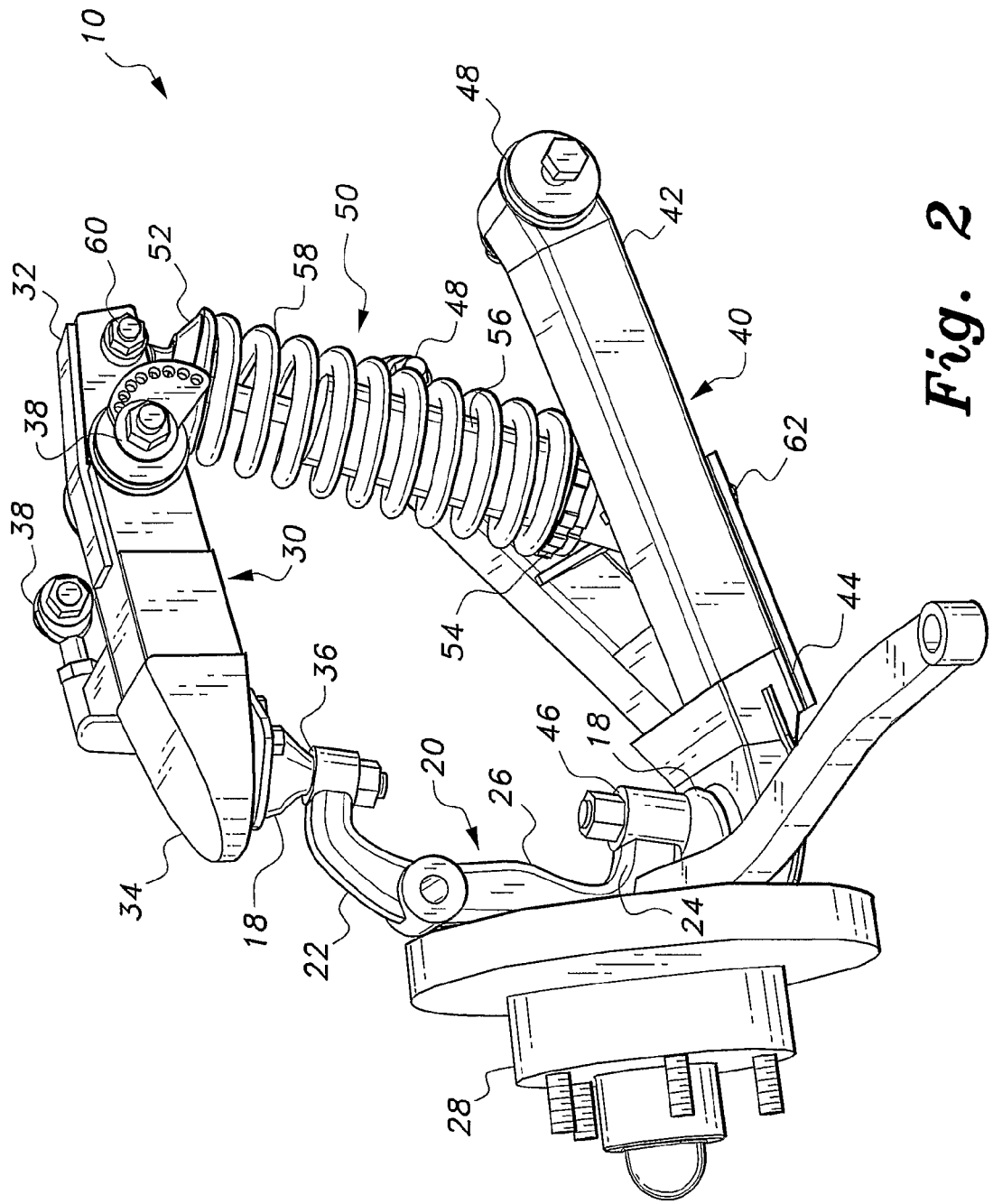
FIG. 2 is a perspective view of the variable ratio floating suspension system for vehicles according to the present invention showing the system configured for use with a front suspension of a vehicle.

As shown in FIG. 2, the variable ratio floating suspension system 10 according to the present invention is configured for use as a front suspension of a vehicle. The variable ratio floating suspension system 10 includes an upper leverage arm 30, a lower leverage arm 40, a shock absorbing mechanism 50 operatively connected to the upper and lower leverage arms 30 and 40, and an actuating arm 20 operatively connected to upper and lower leverage arms 30 and 40 through pivot joints 36 and 46, respectively. The shock absorbing mechanism 50 is interposed between the upper and lower leverage arms 30 and 40. The shock absorbing mechanism 50 includes a shock absorber 56 and spring assembly 58, such as a coil shock absorber. Alternatively, the shock absorbing mechanism 50 can be a shock absorber and airbag assembly. The actuating member 20 defines a knuckle or spindle 26 having an upper portion 22 and a lower portion 24.

The upper leverage arm 30 has a first end portion 32 operatively connected to an upper end portion 52 of the shock absorbing mechanism 50 at upper shock joint 60. The second end portion 34 of the upper leverage arm 30 is pivotally connected at pivot joint 36 to the upper end portion 22 of the spindle 26. The upper leverage arm 30 is pivotally connected to the vehicle chassis or frame (not shown) at pivot joint 38. The pivot joint 38 is positioned on the upper leverage arm 30 between or approximately intermediate the upper shock joint 60 and the pivot joint 36. Pivot joint 36 defines a bushing, through bolt, or ball-and-socket joint 18. Pivot joint 38 defines a bushing, through bolt, or tie-rod joint.

The lower leverage arm 40 has a first end portion 42 pivotally connected to the vehicle chassis or frame (not shown) at pivot joint 48. In this configuration, the lower leverage arm 40 defines a lower control arm configured as a wishbone-type shape. The second end portion 44 of the lower leverage arm 40 is pivotally connected to a lower end portion 24 of the spindle 26 through a pivot joint 46, which defines a bushing or ball-and-socket joint. The lower leverage arm 40 is operatively connected to a lower end portion 54 of the shock absorbing mechanism 50 at lower shock joint 62. The lower shock joint 62 is positioned on the lower leverage arm 40 between or approximately intermediate the pivot joint 46 and the pivot joint 48. Pivot joint 46 defines a bushing, through bolt, or ball-and-socket joint 18. Pivot joint 48 defines a bushing, through bolt, or tie-rod joint.

Figure 3:
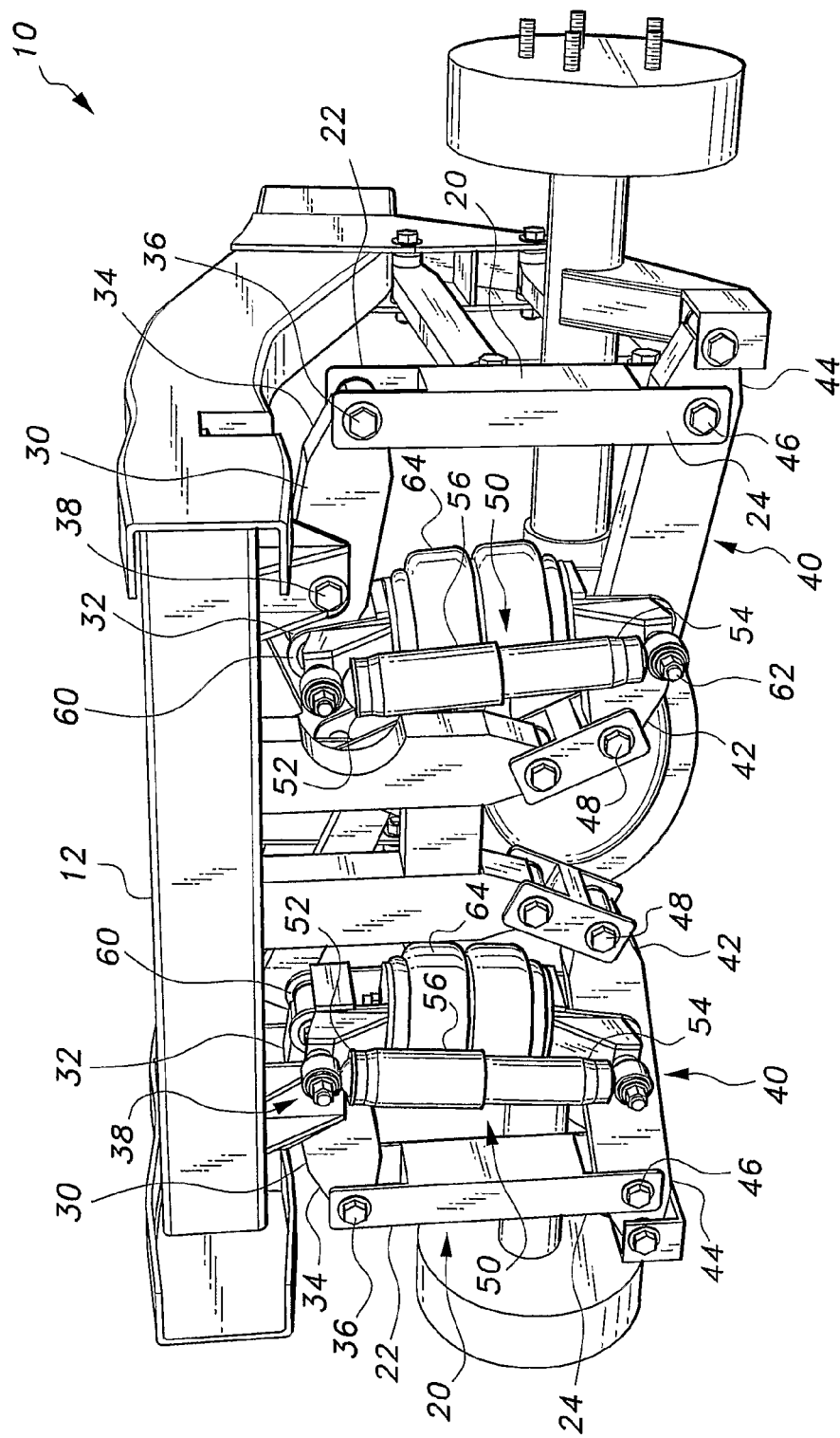
FIG. 3 is a perspective view of the variable ratio floating suspension system for vehicles according to the present invention showing the system configured for use with a rear suspension of a vehicle.

As shown in FIG. 3, the variable ratio floating suspension system 10 according to the present invention is suitable for use as a rear suspension of a vehicle. In this arrangement, the variable ratio floating suspension system 10 includes at least two variable ratio floating suspension systems 10. Each variable ratio floating suspension system 10 comprises an upper leverage arm 30, a lower leverage arm 40, a shock absorbing mechanism 50 interposed between and operatively connected to the upper and lower leverage arms 30 and 40, and an actuating arm 20 operatively connected to upper and lower leverage arms 30 and 40 at pivot joints 36 and 46, respectively. The shock absorbing mechanism 50 includes a shock absorber 56 and an airbag or air bellows 64. However, as described above, a coil shock or coil and shock assembly can be used instead of the airbag and shock assembly depicted in FIG. 3.

The first end portion 32 of the upper leverage arm 30 is operatively connected to the upper end portion 52 of the shock absorber 56 and airbag 64 at upper shock joint 60. The second end portion 34 of the upper leverage arm 30 is pivotally connected to an upper end portion 22 of the actuating arm 20 at a pivot joint 36. The upper leverage arm 30 is pivotally connected to the vehicle chassis or frame 12 at a pivot joint 38. The pivot joint 38 is positioned on the upper leverage arm 30 between or approximately intermediate the upper shock joint 60 and the pivot joint 36.

The first end portion 42 of the lower leverage arm 40 is pivotally connected to the vehicle chassis or frame 12 at a pivot joint 48. The second end portion 44 of the lower leverage arm 40 is pivotally connected to a lower end portion 24 of the actuating arm 20 at a pivot joint 46. The lower leverage arm 40 is operatively connected to a lower end portion 54 of the shock absorber 56 and airbag 64 at lower shock joint 62. The lower shock joint 62 is positioned on the lower leverage arm 40 between or approximately intermediate the pivot joint 46 and the pivot joint 48.

Figure 4:
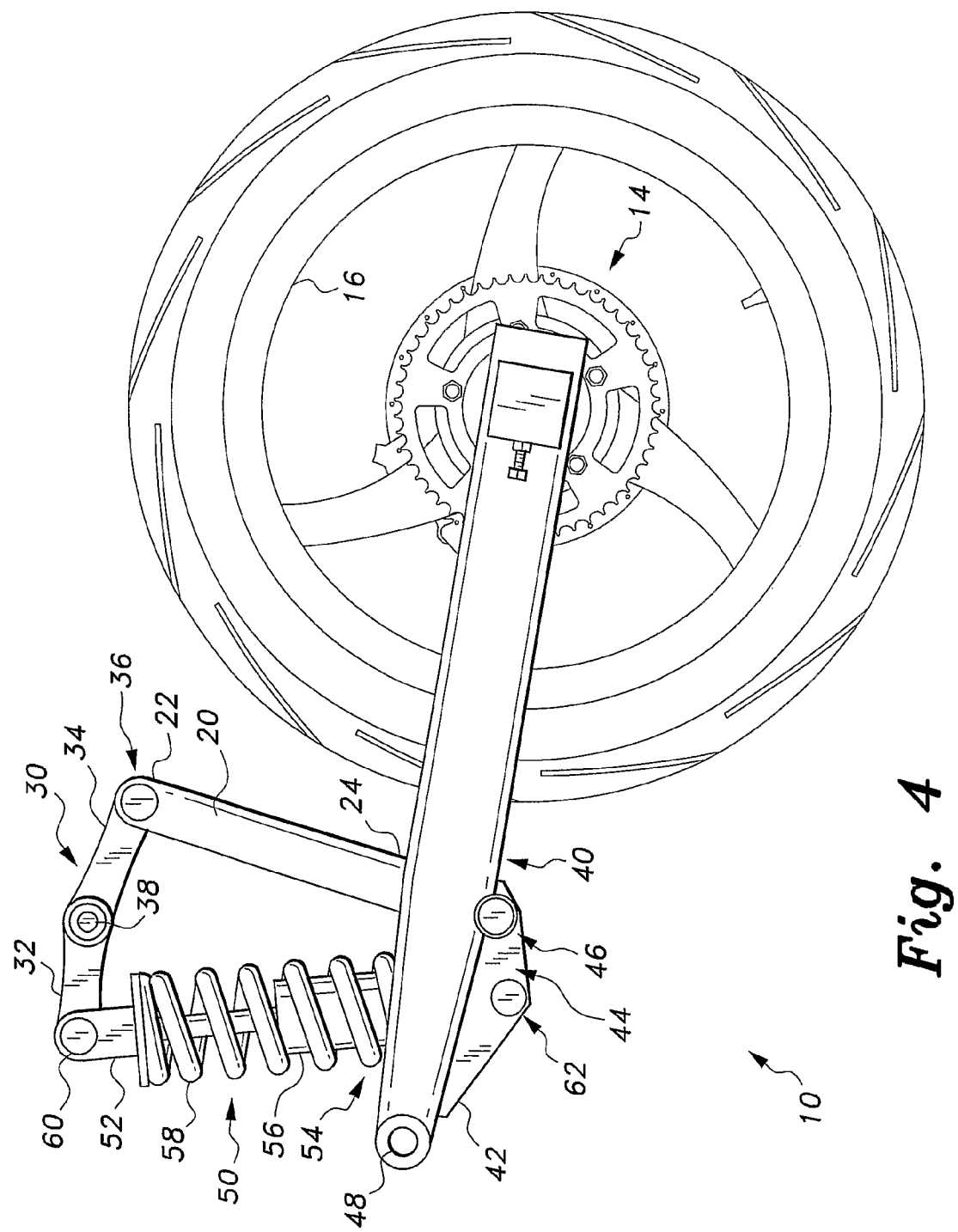
FIG. 4 is a side view of the variable ratio floating suspension system for vehicles according to the present invention showing the system configured for use with a rear suspension of a motorcycle.

Referring to FIG. 4, the variable ratio floating suspension system 10 according to the present invention is adaptable for use as a suspension for a motorcycle or bicycle. Although a rear suspension of a motorcycle is depicted in FIG. 4, the variable ratio floating suspension system 10 is adaptable to be use with the front suspension of a motorcycle or bicycle. The variable ratio floating suspension system 10 includes an upper leverage arm 30, a lower leverage arm 40, a shock absorbing mechanism 50 interposed between and operatively connected to the upper and lower leverage arms 30 and 40, and an actuating arm 20 operatively connected to upper and lower leverage arms 30 and 40 at pivot joints 36 and 46, respectively. The rear wheel 16 of the motorcycle is connected to the lower leverage arm 40 by means of a motorcycle hub 14.

The upper leverage arm 30 includes a first end portion 32 operatively connected to an upper end portion 52 of the shock absorbing mechanism 50 at upper shock joint 60. The second end portion 34 of the upper leverage arm 30 is pivotally connected to an upper end portion 22 of the actuating arm 20 at a pivot joint 36. The upper leverage arm 30 is pivotally connected to the motorcycle frame (not shown) at a pivot joint 38. The pivot joint 38 is positioned on the upper leverage arm 30 between or approximately intermediate the upper shock joint 60 and the pivot joint 36.

The lower leverage arm 40 has a first end portion 42 pivotally connected to a motorcycle frame (not shown) at a pivot joint 48. The second end portion 44 of the lower leverage arm 40 is pivotally connected to a lower end portion 24 of the actuating arm 20 at a pivot joint 46. The lower leverage arm 40 is operatively connected to a lower end portion 54 of the shock absorbing mechanism 50 at lower shock joint 62. The lower shock joint 62 is positioned on the lower leverage arm 40 between or approximately intermediate the pivot joint 46 and the pivot joint 48. The lower leverage arm 40 extends rearwardly from pivot joint 48 to motorcycle hub 14.

Figure 5:
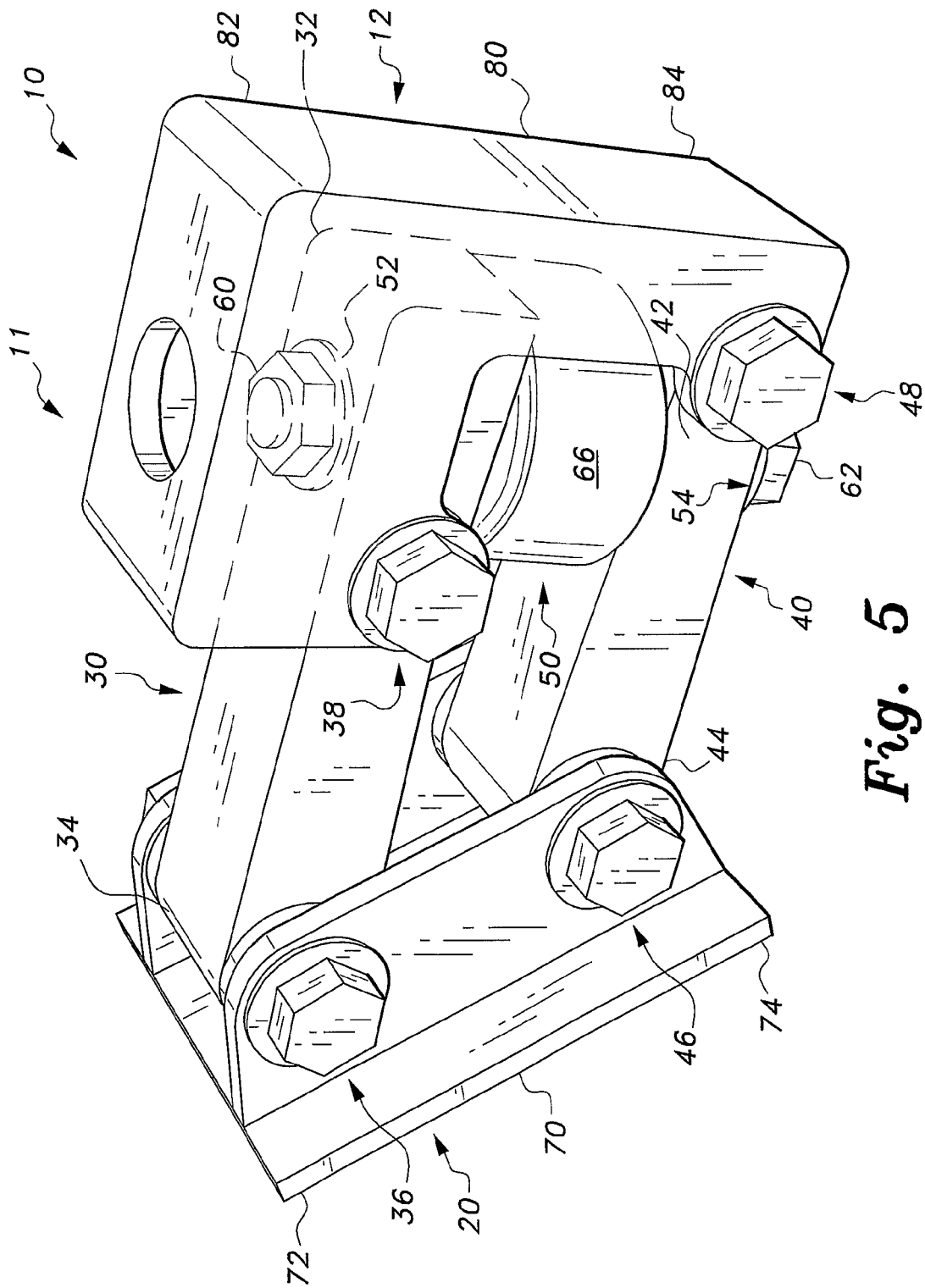
FIG. 5 is a perspective view of the variable ratio floating suspension system for vehicles according to the present invention showing the system configured for use as an anti-vibration mount.

As illustrated in FIG. 5, the variable ratio floating suspension system 10 defines an anti-vibration mount 11. The anti-vibration mount 11 is configured to be mounted anywhere that requires isolating vibrational forces. For example, the anti-vibration mount 11 can be mounted interposed between a vehicle chassis and a vehicle cab or interposed between a vehicle body and vehicle frame. Additionally, the anti-vibration mount 11 can be employed as an engine mount, such that the anti-vibration mount 11 is interposed between the engine block and the vehicle chassis.

The anti-vibration mount 11 includes an upper leverage arm 30 having a first end portion 32 connected to an upper portion 52 of a shock absorbing or dampening mechanism 50, such as an airbag, air bellow, solid rubber, polyurethane or shock 66. A second end portion 34 of the upper leverage arm 30 is pivotally connected to an upper portion 72 of a movable bracket or plate 70, which is defined by the actuating arm 20. The upper leverage arm 30 is pivotally connected to an upper portion 82 of a support bracket or plate 80 at a pivot joint 38, which is positioned between or approximately intermediate pivot joint 36 and upper dampening joint 60. The frame 12 defines the support bracket 80.

The anti-vibration mount 11 further includes a lower leverage arm 40 having a first end portion 42 pivotally connected to a lower portion 84 of support bracket 80 at a pivot joint 48. The second end portion 44 of the lower leverage arm 40 is pivotally connected to the lower end portion 74 of movable bracket 70. The lower portion 54 of dampening mechanism 50 is connected to the lower leverage arm 40 at lower dampening joint 62. The lower dampening joint 62 is positioned on the lower leverage arm 40 between or approximately intermediate the pivot joint 46 and the pivot joint 48.

The pivot joints and upper and lower shock or dampening joints illustrated in FIGS. 1-5 can be any suitable connecting joint, such as bushings, through bolts, pivot pins, tie-rod joints, or ball-and-socket joints. In addition, the size, shape, geometry, and materials used to construct and configure the variable ratio floating suspension system 10 will vary depending on the application and environment that utilizes the variable ratio floating suspension system 10. For example, a compact car will usually have a lighter and smaller suspension components, which are generally made of lightweight material, such as cast or extruded aluminum. In contrast, a one-ton truck typically has suspension components made of heavier and thicker material, such as cast or stamped steel. However, it will be appreciated that the principles, design, and operation of the variable ratio floating suspension system 10 will remain the same regardless of the size or shape of the suspension components.

Similarly, the suspension system 10 of the current invention is not limited to use with a vehicle and may be used in any application requiring vibration dampening. Although the application refers to the suspension system 10 as attached to a vehicle chassis 12, the system 10 may also be attached to any frame component or base member.

It is to be understood that the present invention is not limited to the embodiments described above, but encompasses any and all embodiments within the scope of the following claims.

I claim:

1. A variable ratio floating suspension system, comprising:
   an actuating arm having an upper end portion and a lower end portion;
   an upper leverage arm adapted for being pivotally connected to a base member at a first pivot joint, the upper leverage arm having a first end portion and having a second end portion pivotally connected to the upper end portion of the actuating arm at a second pivot joint;

a lower leverage arm having a first end portion adapted for being pivotally connected to the base member at a third pivot joint and a second end portion pivotally connected to the lower end portion of the actuating arm at a fourth pivot joint; and a shock absorbing mechanism having an upper end portion operatively connected to the upper leverage arm through an upper shock joint at the first end portion of the upper leverage arm and a lower end portion operatively connected to the lower leverage arm at a lower shock joint, the shock absorbing mechanism being interposed between the upper leverage arm and the lower leverage arm.

2. The variable ratio floating suspension system as recited in claim 1, wherein the first pivot joint is positioned between the upper shock joint and the second pivot joint.

3. The variable ratio floating suspension system as recited in claim 2, wherein said lower shock joint is positioned between said first and second end portions of said lower leverage arm.

4. The variable ratio floating suspension system as recited in claim 1, wherein said actuating arm, said upper leverage arm and said lower leverage arm are sized and positioned so that pivoting said upper and lower leverage arms results in a corresponding simultaneous compression or corresponding simultaneous expansion movement of said upper and lower end portions of said shock absorbing mechanism, said upper end portion moving at the same rate as said lower end portion.

5. The variable ratio floating suspension system as recited in claim 1, wherein said fourth pivot joint is a pivot joint selected from the group consisting of a bushing, a through bolt, and a ball-and-socket joint.

6. The variable ratio floating suspension system as recited in claim 1, wherein said third pivot joint is a pivot joint selected from the group consisting of a bushing, a through bolt, and a tie-rod joint.

7. The variable ratio floating suspension system as recited in claim 1, wherein said first pivot joint is a pivot joint selected from the group consisting of a bushing, a through bolt, and a tie-rod joint.

8. The variable ratio floating suspension system as recited in claim 1, wherein said second pivot joint is a pivot joint selected from the group consisting of a bushing, a through bolt, and a ball-and-socket joint.

9. The variable ratio floating suspension system recited in claim 1, wherein said actuating arm comprises a vehicle wheel spindle.

10. The variable ratio floating suspension system recited in claim 1, wherein said actuating arm comprises a movable bracket.

\* \* \* \* \*